(12) United States Patent
Han

(10) Patent No.: US 8,624,948 B2
(45) Date of Patent: Jan. 7, 2014

(54) APPARATUS AND METHOD OF DETECTING HORIZONTAL SYNCHRONIZATION SIGNAL IN IMAGE FORMING APPARATUS

(75) Inventor: Hyun-Jin Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 162 days.

(21) Appl. No.: 12/776,451

(22) Filed: May 10, 2010

(65) Prior Publication Data
US 2011/0069135 A1    Mar. 24, 2011

(30) Foreign Application Priority Data

Sep. 22, 2009  (KR) .................. 10-2009-0089650

(51) Int. Cl.
*B41J 2/47* (2006.01)
*B41J 2/435* (2006.01)

(52) U.S. Cl.
USPC .......................... 347/235; 347/250

(58) Field of Classification Search
None
See application file for complete search history.

(56) References Cited

U.S. PATENT DOCUMENTS

| 5,570,195 A * | 10/1996 | Honbo .................. 358/302 |
| 6,124,948 A * | 9/2000 | Kamioka .................. 358/409 |
| 6,459,520 B1 * | 10/2002 | Takayama .................. 359/204.1 |
| 2006/0092493 A1 * | 5/2006 | Yoshikawa et al. .......... 359/216 |
| 2009/0067024 A1 * | 3/2009 | Shiraishi ................. 359/205 |

FOREIGN PATENT DOCUMENTS

JP    2008126587 A *  6/2008

* cited by examiner

*Primary Examiner* — Matthew Luu
*Assistant Examiner* — Kendrick Liu
(74) *Attorney, Agent, or Firm* — Staas & Halsey LLP

(57) ABSTRACT

Provided is a device for detecting a horizontal synchronization signal of an image forming apparatus. The device includes a light intensity converter to convert light intensity of a first beam emitted from a first light source and light intensity of a second beam emitted from a second light source to be different from each other, and outputting the first and second beams; a photo detector to receive the first beam and the second beam output from the light intensity converter, and outputting a first signal having a first level at a time of receiving the first beam and a second level at a time of receiving the second beam; and a horizontal synchronization signal detector to detect a horizontal synchronization signal of the first beam and a horizontal synchronization signal of the second beam by using the first signal.

21 Claims, 10 Drawing Sheets

APPARATUS AND METHOD OF DETECTING HORIZONTAL SYNCHRONIZATION SIGNAL IN IMAGE FORMING APPARATUS

CROSS-REFERENCE TO RELATED APPLICATIONS

This application claims the benefit of Korean Patent Application No. 10-2009-0089650, filed on Sep. 22, 2009, in the Korean Intellectual Property Office, the disclosure of which is incorporated herein in its entirety by reference.

BACKGROUND

1. Field

The present general inventive concept relates to an apparatus and method of detecting a horizontal synchronization signal of an image forming apparatus.

2. Description of the Related Art

Image forming apparatuses form images on printing media according to input signals, for example, printers, copying machines, faxing machines, and multifunctional devices combine functions of printers, copying machines, and faxing machines.

Tandem-type image forming apparatuses adopt an electrophotographic image forming method. Generally, a tandem-type image forming apparatus include a photosensitive medium, the number of which corresponds to the number of colors used in a printing operation. Since a color image forming apparatus generally uses toners of four colors, that is, yellow, magenta, cyan, and black colors, the tandem-type image forming apparatus includes four light sources and four photosensitive media, which respectively correspond to the four color toners.

Therefore, the color image forming apparatus forms an electrostatic latent image by focusing laser beams emitted from the four light sources according to image signals on photosensitive media corresponding to each of light sources. Here, a horizontal synchronization signal is used to coincide light scanning times of the four colors, and four photosensors are required to detect the horizontal synchronization signal from each of the colors. Therefore, there is a need to simplify a structure of an image forming apparatus and reduce fabrication costs by detecting the horizontal synchronization signal of each color with a small number of photosensors.

SUMMARY

An embodiment or embodiments provide an apparatus and/or method of detecting a horizontal synchronization signal of an image forming apparatus.

An embodiment, includes a device for detecting a horizontal synchronization signal of an image forming apparatus, the device including: a light intensity converter to convert light intensity of a first beam emitted from a first light source and light intensity of a second beam emitted from a second light source to be different from each other, and to output the first and second beams; a photo detector to receive the first beam and the second beam output from the light intensity converter, and to output a first signal having a first level at a time of receiving the first beam and a second level at a time of receiving the second beam; and a horizontal synchronization signal detector to detect a horizontal synchronization signal of the first beam and a horizontal synchronization signal of the second beam by using the first signal is provided.

Another embodiment, includes a method of detecting a horizontal synchronization signal of an image forming apparatus, the method including: converting light intensity of a first beam emitted from a first light source and light intensity of a second beam emitted from a second light source to be different from each other and outputting the first and second beams; receiving the first beam and the second beam by a photo detector, and outputting a first signal having a first level at a time of receiving the first beam and a second level at a time of receiving the second beam; and detecting a horizontal synchronization signal of the first beam and a horizontal synchronization signal of the second beam by using the first signal is provided.

According to another embodiment, there is provided a computer readable recording medium having embodied thereon a computer program for executing the above method.

BRIEF DESCRIPTION OF THE DRAWINGS

The above and other features and advantages of the embodiment will become more apparent by describing in detail exemplary embodiments thereof with reference to the attached drawings in which.

DETAILED DESCRIPTION

An embodiment or embodiments will now be described more fully with reference to the accompanying drawings, in which exemplary embodiments are shown.

Figure 1:
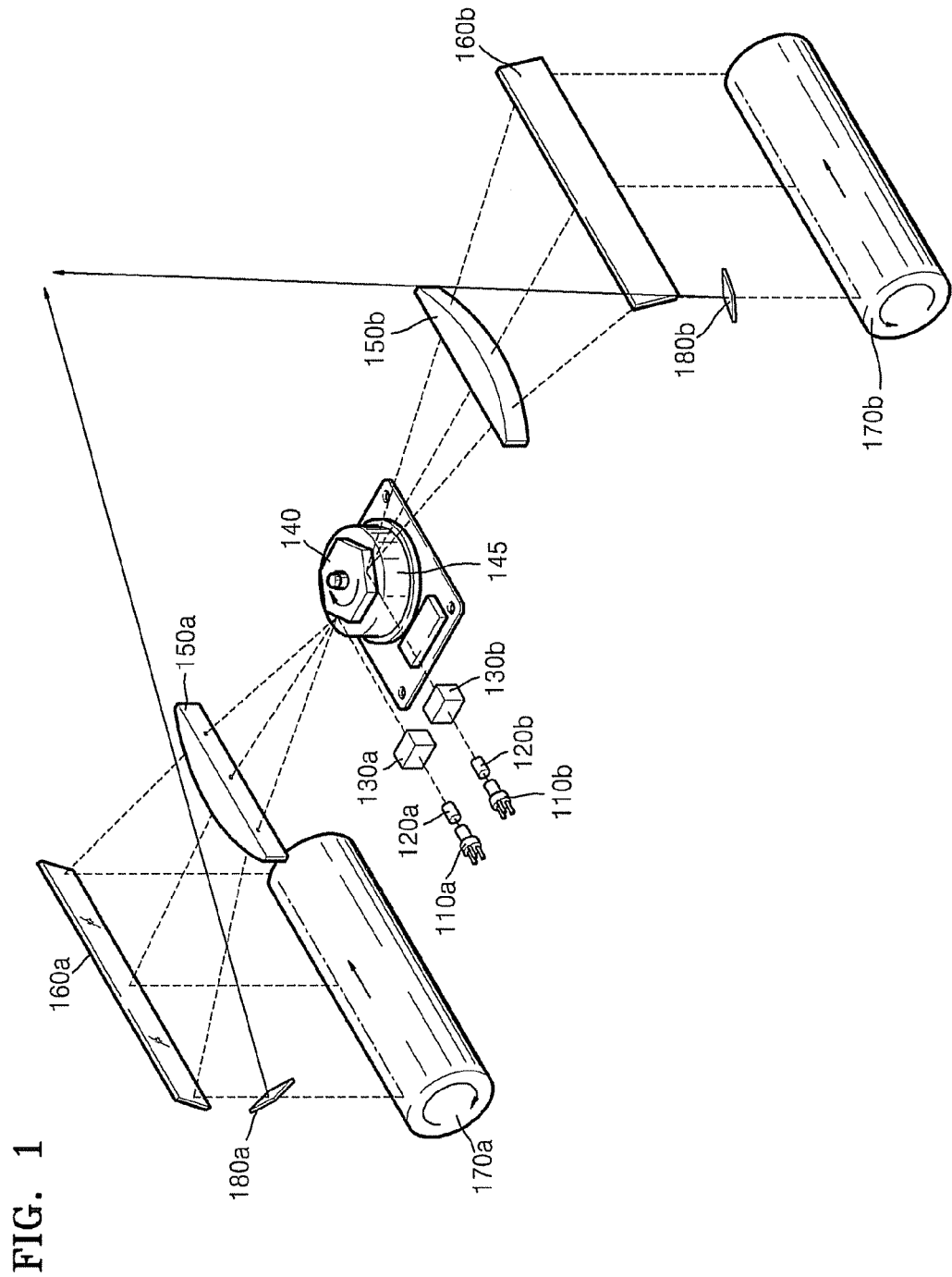
FIG. 1 is a diagram illustrating a beam path in a light scanning device of an image forming apparatus according to an embodiment.

FIG. 1 is a diagram illustrating paths of beams in a light scanning device in an image forming apparatus according to an embodiment of the present invention. A light scanning device of a color image forming apparatus includes four light sources, which respectively scan yellow (Y), magenta (M), cyan (C), and black (K) beams to form electrostatic latent images on four photosensitive media, respectively. In the light scanning device of the image forming apparatus shown in FIG. 1, two light sources, that is, C and K light sources, are only shown, and paths of C and K beams emitted from the C and K light sources are denoted. Although it is not shown in FIG. 1, beams emitted from Y and M light sources may have the same paths as the paths of C and K beams emitted from the C and K light sources shown in FIG. 1.

Hereinafter, the paths of the beams in the light scanning device of the image forming apparatus according to an embodiment will be described as follows. For convenience of description, the light source of the C beam is denoted as a first light source 110a, and the light source of the K beam is denoted as a second light source 110b. The first light source 110a and the second light source 110b respectively emit a first beam and a second beam which have the same light intensity as each other at a predetermined time interval. The first beam and the second beam respectively emitted from the first light source 110a and the second light source 110b are collimated by collimating lenses 120a and 120b, and the first and second beams transmitting the collimating lenses 120a and 120b are condensed on a reflective surface of a polygon mirror 140 after transmitting through cylinder lenses 130a and 130b, respectively. In addition, the first and second beams which are respectively emitted from the first and second light sources 110a and 110b are condensed on different reflective surfaces of one polygon mirror 140, and then, are reflected in a first direction and a second direction, respectively. The polygon mirror 140 is rotated at a constant speed by a driving motor 145 to scan the first beam and the second beam at a constant linear velocity. The first and second beams of constant velocity are reflected by the polygon mirror 140, and then, aberrations of the first and second beams are corrected by corresponding focusing lenses 150a and 150b and the first and second beams are respectively focused on surfaces of photosensitive media 170a and 107b as electrostatic latent images by reflecting mirrors 160a and 160b. Alternatively, since a horizontal synchronization signal for coinciding the light scanning times of the Y and C colors is used, a device (not shown) for detecting the horizontal synchronization signal in the image forming apparatus of the embodiment includes horizontal synchronization signal detecting mirrors 180a and 180b on the paths of the beams reflected by the reflecting mirrors 160a and 160b toward the photosensitive media 170a and 170b, and receives the first and second beams reflected by the horizontal synchronization signal detecting mirrors 180a and 180b by using one photosensor (not shown) to detect the horizontal synchronization signal. In the embodiment, the horizontal synchronization detecting mirrors 180a and 180b are located on the paths of the beams reflected by the reflecting mirrors 160a and 160b toward the photosensitive media 170a and 170b to receive the first and second beams emitted from the first and second light sources 110a and 110b; however, the present invention is not limited thereto. That is, the horizontal synchronization signal detecting mirrors 180a and 180b may be located on another location provided that the beam paths are configured so that one sensor receives the first and second beams emitted from the first and second light sources 110a and 110b.

Figure 2:
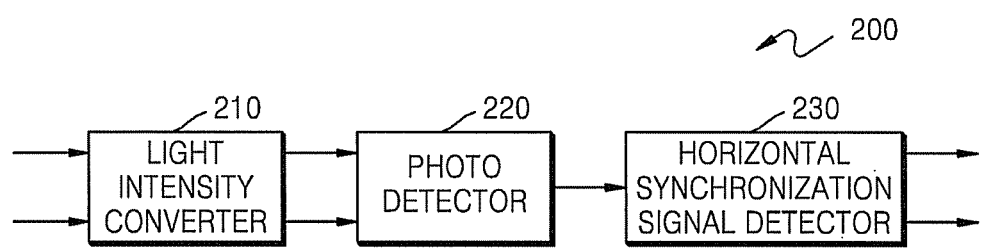
FIG. 2 is a block diagram of a device for detecting a horizontal synchronization signal in the image forming apparatus, according to an embodiment of the present invention.

FIG. 2 is a block diagram of a device 200 for detecting a horizontal synchronization signal a the image forming apparatus, according to an embodiment of the present invention. As shown in FIG. 2, the device 200 for detecting the horizontal synchronization signal includes a light intensity converter 210, a photo detector 220, and a horizontal synchronization signal detector 230. An example of the photo detector 220 is a photodiode.

The first beam emitted from the first light source 110a and the second beam emitted from the second light source 110b are input into the light intensity converter 210. Here, the first and second beams are reflected by the horizontal synchronization signal detecting mirrors 180a and 180b shown in FIG. 1, and then, input into the light intensity converter 210. The light intensity converter 210 converts the light intensities of the first beam and the second beam to be different from each other, and outputs the first and second beams. The device 200 for detecting the horizontal synchronization signal according to the embodiment reduces the light intensity of the second beam so as that the light intensities of the first and second beams are different from each other.

Figure 3:
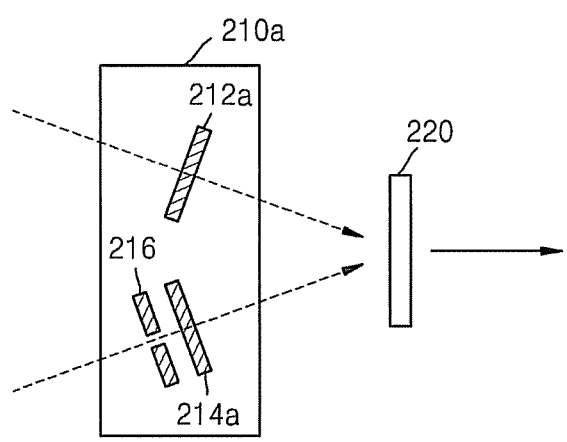
FIG. 3 is a diagram of a light intensity converter in a device for detecting a horizontal synchronization signal in the image forming apparatus, according to the embodiment.

FIG. 3 is a diagram showing a structure of a light intensity converter 210a in a device for detecting a horizontal synchronization signal of an image forming apparatus, according to an embodiment.

As shown in FIG. 3, the light intensity converter 210a of the present embodiment includes first and second beam detecting lenses 212a and 214a and a slit 216.

The first beam detecting lens 212a is located on a proceeding path of the first beam, and converts the first beam so as to be received by the photo detector 220.

The slit 216 is located on a proceeding path of the second beam, and reduces the light intensity of the second beam. Here, the slit 216 may be formed as a rib form, or may be formed of a sub-material.

The second beam detecting lens 214a is located on the proceeding path of the second beam which transmits through the slit 216, and converts the second beam that transmitted through the slit 216 so as to be received by the photo detector 220.

As described above, when the first beam detecting lens 212a is located on the proceeding path of the first beam and the slit 216 and the second beam detecting lens 214a are located on the proceeding path of the second beam, the light intensity of the second beam may be reduced. The first beam emitted from the first light source 110a and the second beam emitted from the second light source 110b may have the same light intensities as each other; however, only some of the second beam may be transmitted through the slit 216. Thus, the light intensity of the second beam becomes less than that of the first beam. It is understood that the first beam intensity and the second beam's intensity may be different from each other.

Figure 4:
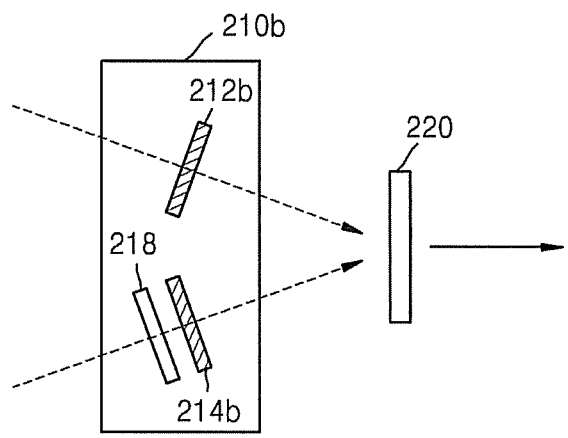
FIG. 4 is a diagram of a light intensity converter in a device for detecting a horizontal synchronization signal in an image forming apparatus according to another embodiment.

FIG. 4 is a diagram of a structure of a light intensity converter 210b in the device for detecting a horizontal synchronization signal of an image forming apparatus, according to another embodiment.

As shown in FIG. 4, the light intensity converter 210b includes first and second beam detecting lenses 212b and 214b and a filter 218.

The first and second beam detecting lenses 212b and 214b of FIG. 4 have the same structures as those of the first and second beam detecting lenses 212a and 214a shown in FIG. 3, and thus, detailed descriptions thereof are not provided here. The filter 218 shown in FIG. 4 is located on the proceeding path of the second beam, like the slit 216 of FIG. 3, and reduces the light intensity of the second beam. An optical member having a light transmittance and adjusting the light intensity of received beam due to an interference between transmitted light and reflected light, for example, a neutral density (ND) filter, may be used as the filter 218.

Figure 5:
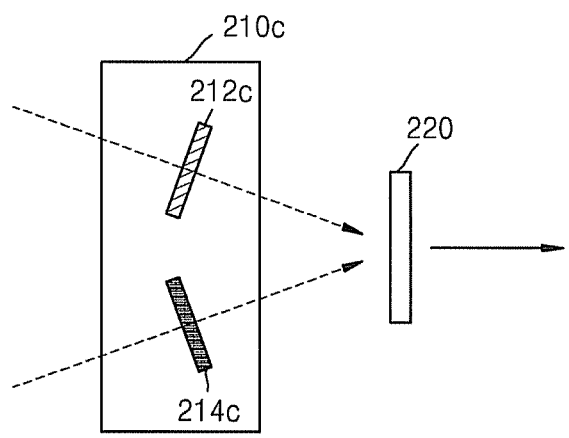
FIG. 5 is a diagram of a light intensity converter in a device for detecting a horizontal synchronization signal in an image forming apparatus, according to another embodiment.

FIG. 5 is a diagram showing a structure of a light intensity converter 210c in a device for detecting a horizontal synchronization signal in an image forming apparatus, according to another embodiment.

As shown in FIG. 5, the light intensity converter 210c according to the present embodiment includes first and second beam detecting lenses 212c and 214c.

The first beam detecting lens 212c is located on the proceeding path of the first beam to convert the first beam to be suitable for the photo detector 220 and output the first beam. In addition, the second beam detecting lens 214c is located on the proceeding path of the second beam to convert the second beam to be suitable for the photo detector 220 and output the second beam. The first beam detecting lens 212c and the second beam detecting lens 214c have different transmittances from each other. In the light intensity converter 210c of the present embodiment, the second beam detecting lens 214c has a transmittance which is lower than that of the first beam detecting lens 212c so that the light intensity of the beam transmitting through the second beam detecting lens 214c is reduced. Here, any kind of lens that may change the light intensity of a beam may be used as a beam detecting lens.

Referring to FIG. 2, the photo detector 220 receives the first beam and the second beam output from the light intensity converter 210, and outputs a first signal having a first level at the time of receiving the first beam and having a second level, which is lower than the first level, at the time of receiving the second beam. In general, a photo detector receives light and converts the received light into electric current. Therefore, the photo detector 220 of the embodiment receives the beams from the light intensity converter 210, and converts the received beams into an electric signal and outputs the electric signal. It is noted that the photo detector may be a photodiode.

The horizontal synchronization signal detector 230 detects a horizontal synchronization signal of the first beam and a horizontal synchronization signal of the second beam using the first signal transmitted from the photo detector 220.

Figure 6:
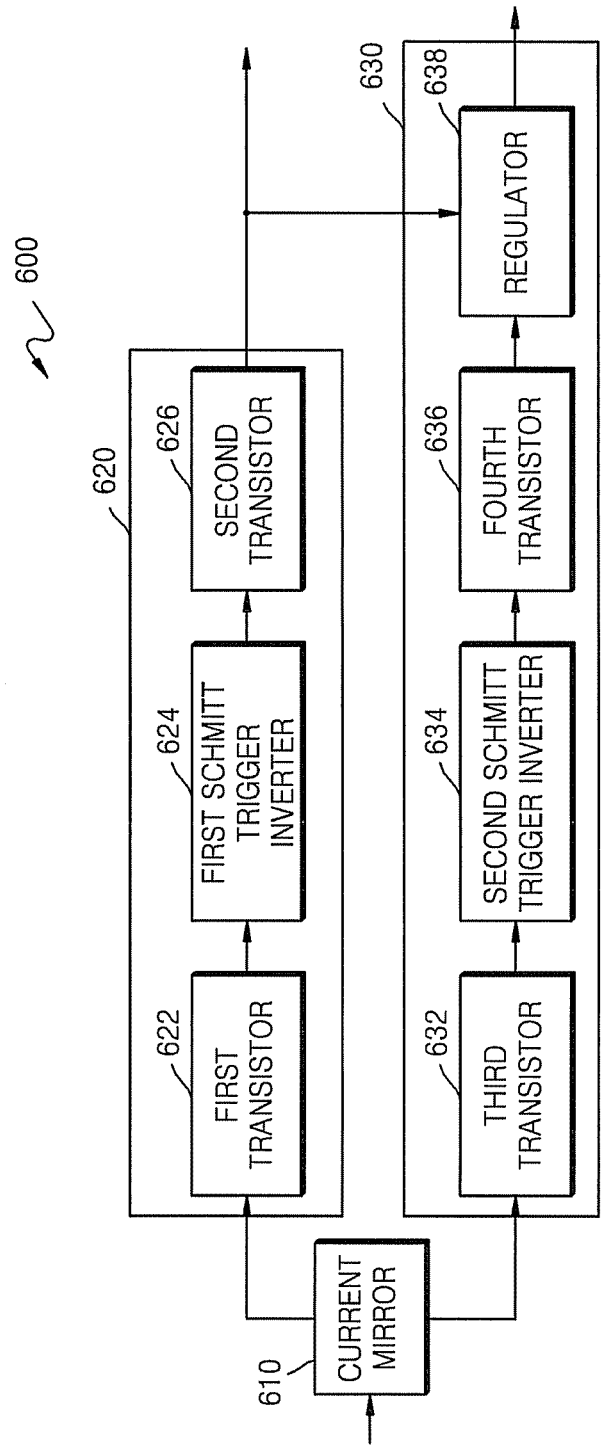
FIG. 6 is a block diagram of a horizontal synchronization signal detector in a device for detecting a horizontal synchronization signal in an image forming apparatus according to an embodiment.

FIG. 6 is a block diagram of a horizontal synchronization signal detector 600 in a device for detecting a horizontal synchronization signal of an image forming apparatus, according to another embodiment.

Referring to FIG. 6, the horizontal synchronization signal detector 600 according to the present embodiment includes a current mirror 610, a first beam horizontal synchronization signal detector 620, and a second beam horizontal synchronization signal detector 630.

The first beam horizontal synchronization signal detector 620 includes a first transistor 622, a first Schmitt trigger inverter 624, and a second transistor 626. In addition, the second beam horizontal synchronization signal detector 630 includes a third transistor 632, a second Schmitt trigger inverter 634, a fourth transistor 636, and a regulator 638. It is understood that the horizontal synchronization signal detector 600 is an example of a horizontal synchronization signal detector 630.

Figure 7:
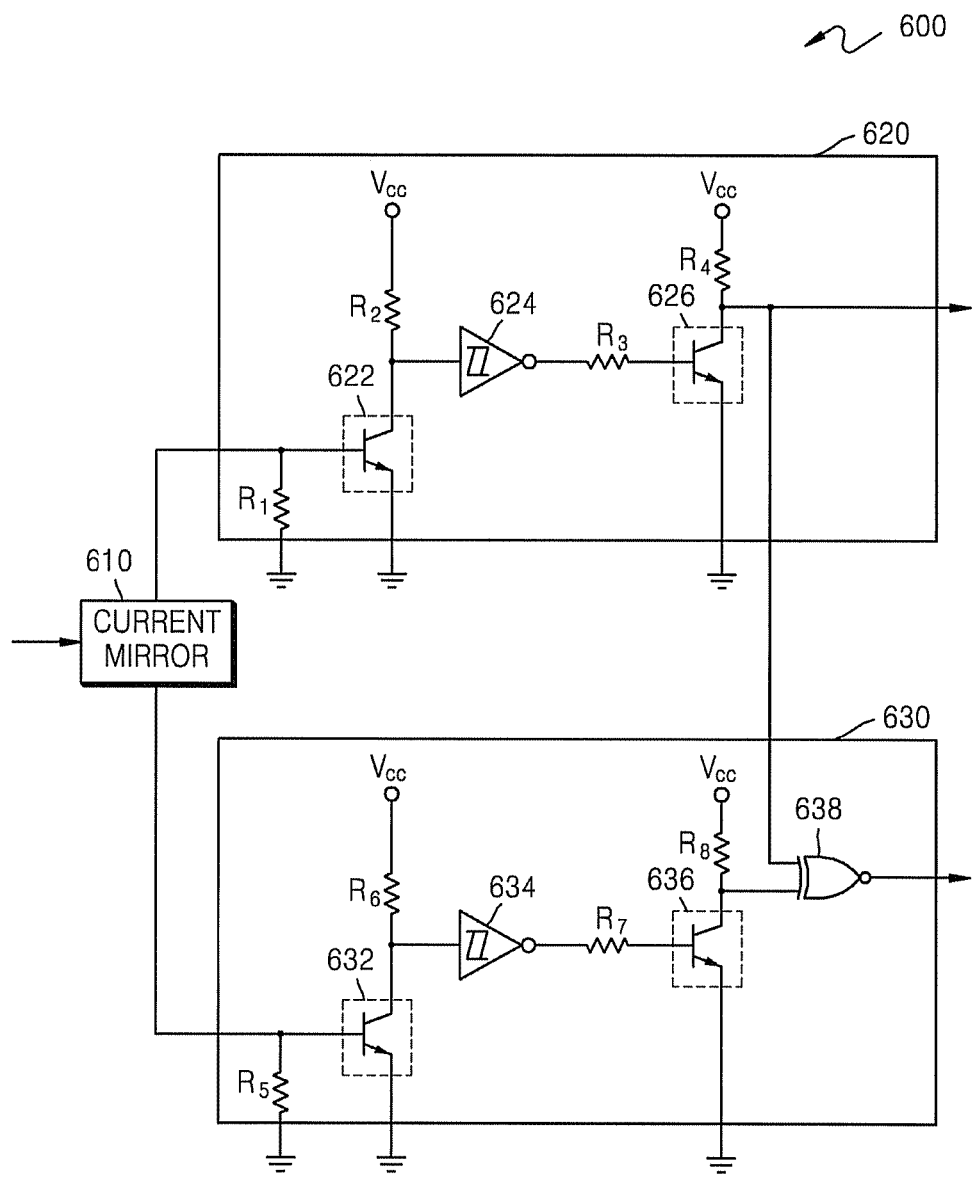
FIG. 7 is a circuit diagram of the horizontal synchronization signal detector of FIG. 6, in a device for detecting a horizontal synchronization signal in an image forming apparatus, according to an embodiment.

FIG. 7 is a circuit diagram of a horizontal synchronization signal detector 600 in a device for detecting a horizontal synchronization signal of an image forming apparatus, according to an embodiment. FIG. 7 shows a circuit diagram of the horizontal synchronization signal detector 600 of FIG. 6, and the operations of the horizontal synchronization signal detector 600 will be described with reference to FIG. 7.

The current mirror 610 receives a first signal from the photo detector 220, and outputs the received first signal to the first beam horizontal synchronization signal detector 620 and the second beam horizontal synchronization signal detector 630.

Figure 8:
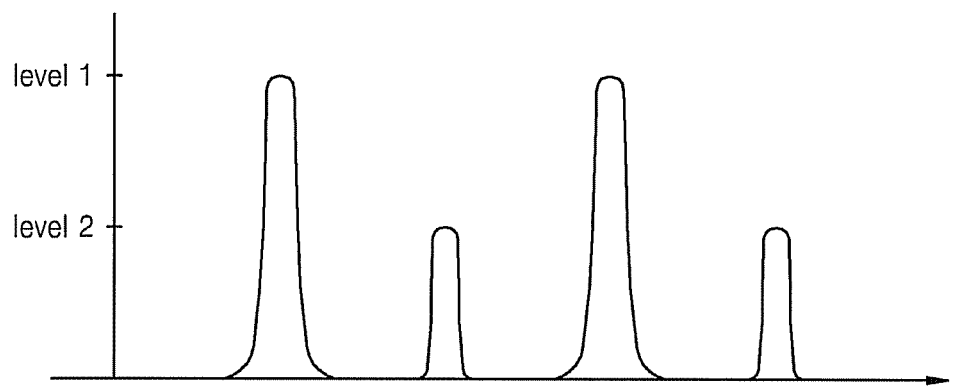
FIG. 8 is a waveform diagram of a first signal output from a photo detector of a device for detecting a horizontal synchronization signal in an image forming apparatus, according to an embodiment.

FIG. 8 is a waveform diagram of the first signal output from the photo detector 220 in a device for detecting a horizontal synchronization signal in an image forming apparatus, according to an embodiment.

The photo detector 220 receives the first beam and the second beam at a predetermined time interval. Since the photo detector 220 outputs an electric signal according to a received beam, the photo detector 220 outputs the first signal having a first level and a second level at a predetermined time interval. Here, the first and second levels are in proportion to the light intensities of the beams, and the second level of the first signal is lower than the first level of the first signal.

The first signal is inputs to both the first beam horizontal synchronization signal detector 620 and the second beam horizontal synchronization signal detector 630; however, the operations of the first and second beam horizontal synchronization signal detectors 620 and 630 are different from each other.

First, the operations of the first beam horizontal synchronization signal detector 620 will be described as follows. The first transistor 622 is electrically conducted in a period of the first level of the first signal, and then, outputs a third signal which is inverted from a second signal having a first level at a time of receiving the first beam. The first transistor 622 includes an NPN-type transistor, where a collector of the first transistor 622 is connected to a driving voltage Vcc, a base of the first transistor 622 is connected to a current mirror, and an emitter of the first transistor 622 is grounded. In the first transistor 622, when a base-emitter voltage is 0.7 V or greater, the collector and the emitter are conducted electrically. The first signal has high values of a first level and a second level, where the first level and the second level of the first signal are different from each other. The first transistor 622 sets a resistance of a resistor R1 so as to be conducted electrically at the first level or greater. It is because when a constant electric current is supplied to the first transistor 622, the base-emitter of the first transistor voltage varies depending on the resistance of the resistor R1. Otherwise, a transistor having a base voltage which is electrically conducted at the first level or greater is used as the first transistor 622 so that the first transistor 622 is electrically conducted in a section of the first level of the first signal. As described above, since the first transistor 622 is only electrically conducted in the section of the first level of the first signal, and not conducted in a section of the second level. Therefore, the first transistor 622 outputs a third signal which is obtained by inverting the second signal having the first level at a time of receiving the first beam.

Figure 9:
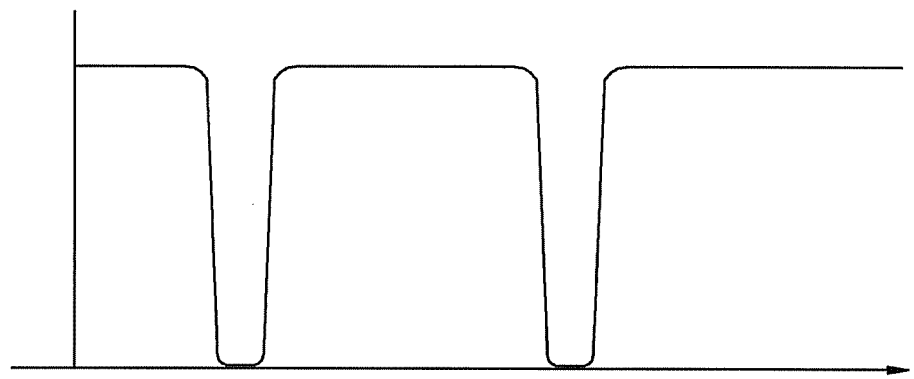
FIG. 9 is a waveform diagram of a third signal output from a first transistor, according to an embodiment.

FIG. 9 is a waveform diagram of the third signal output from the first transistor 622 according to an embodiment. As shown in FIG. 9, the third signal is obtained by inverting the second signal of the first level, and has a waveform having a low value in the section of the first level.

The third signal is input to the first Schmitt trigger inverter 624, and the first Schmitt trigger inverter 624 outputs a fourth signal which is a square wave signal which is obtained by inverting the third signal. According to the characteristics of a Schmitt trigger inverter, the third signal is inverted, and the fourth signal is output from the first Schmitt trigger inverter 624.

Figure 10:
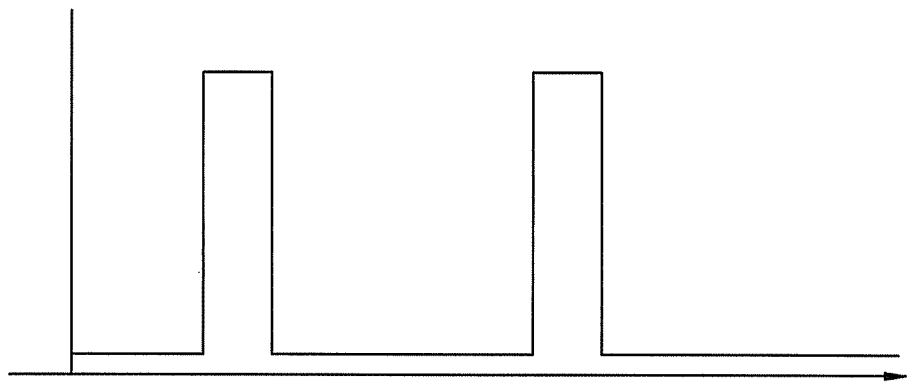
FIG. 10 is a waveform diagram of a fourth signal output from a first Schmitt trigger inverter, according to an embodiment.

FIG. 10 is a waveform diagram of the fourth signal output from the first Schmitt trigger inverter 624 according to an embodiment. As shown in FIG. 10, the fourth signal has a square waveform having a high value in the section of the first level of the first signal.

The fourth signal is input to the second transistor 626, and the second transistor 626 is electrically conducted in the section of the first level of the first signal, that is, in the section in which the fourth signal has a high value, so as to output a signal which is obtained by inverting the fourth signal and detect the output signal as the horizontal synchronization signal of the first beam. The second transistor 626 includes an NPN transistor. A collector of the second transistor 626 is connected to the driving voltage Vcc, a base of the second transistor 626 is connected to the first Schmitt trigger inverter 624, and an emitter of the second transistor 626 is grounded. When the fourth signal is in a high state, the collector and the emitter conduct electrically so that a voltage of the emitter is output. In addition, when the fourth signal is in a low state, the driving voltage Vcc is output, and the horizontal synchronization signal of the first beam has a waveform that is obtained by inverting the fourth signal.

Figure 11:
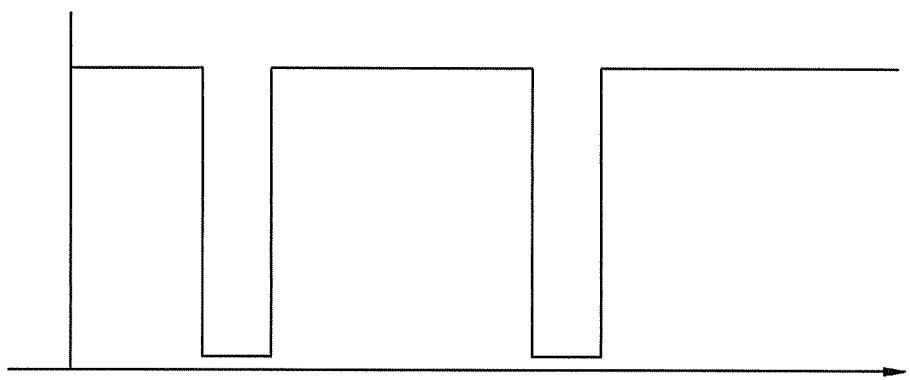
FIG. 11 is a waveform diagram of a horizontal synchronization signal of a first beam in a device for detecting a horizontal synchronization signal in an image forming apparatus, according to an embodiment.

FIG. 11 is a waveform diagram of a horizontal synchronization signal of the first beam in a device for detecting a horizontal synchronization signal of an image forming apparatus, according to an embodiment. As shown in FIG. 11, the horizontal synchronization signal has a waveform which is inverted from the fourth signal of FIG. 10.

The operations of the second beam horizontal synchronization signal detector 630 are as follows. The third transistor 632 is electrically conducted in a section having the first and second levels of the first signal so as to output a fifth signal which is obtained by inverting the first signal. The third transistor 632 also includes an NPN transistor like the first transistor 622. In the third transistor 632, a collector is connected to the driving voltage Vcc, a base of the third transistor 632 is connected to a current mirror, and an emitter is grounded. In the third transistor 632, when a base-emitter voltage is 0.7 V or greater, the collector and the emitter of the third transistor 632 are conducted electrically. The first signal has a high value at the first level and the second level, which are different from each other. The third transistor 632 sets a resistance of the resistor R5 so that the third transistor 632 may be conducted electrically in the section of the first level and the second level or greater. Alternatively, a transistor having a base voltage which is conducted electrically at the first level and the second level of the first signal may be used as the third transistor 632. As described above, since the third transistor 632 is conducted electrically in the section having the first level and the second level of the first signal, the third transistor 632 outputs the fifth signal which is obtained by inverting the first signal at an output terminal of the third transistor 632.

Figure 12:
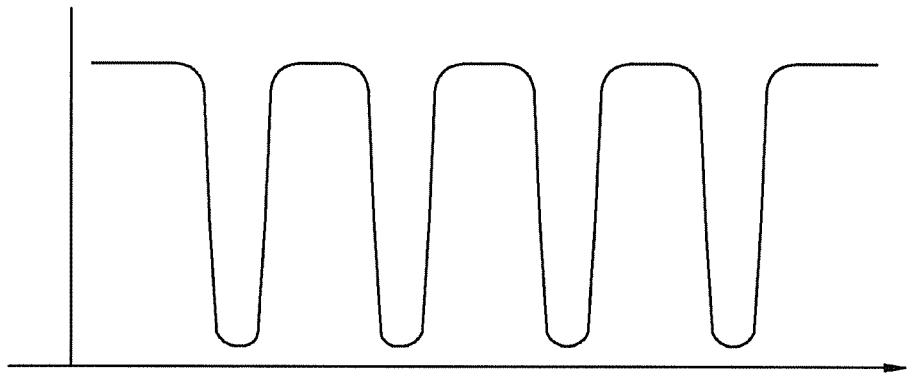
FIG. 12 is a waveform diagram of a fifth signal output from a third transistor, according to an embodiment.

FIG. 12 is a waveform diagram of the fifth signal output from the third transistor 632, according to the an embodiment. As shown in FIG. 12, the fifth signal is obtained by inverting the first signal, and has low values in the section of the first level and the section of the second level of the first signal.

The fifth signal is input to the second Schmitt trigger inverter 634, and the second Schmitt trigger inverter 634 outputs a sixth signal which is a square wave signal obtained by inverting the fifth signal. According to the characteristics of a Schmitt trigger inverter, the fifth signal is inverted, and the sixth signal is output from the second Schmitt trigger inverter 634.

Figure 13:
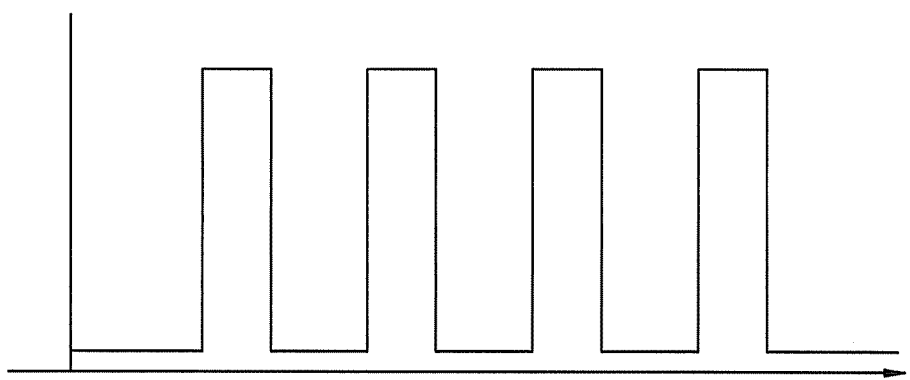
FIG. 13 is a waveform diagram of a sixth signal output from a second Schmitt trigger inverter, according to an embodiment.

FIG. 13 is a waveform diagram of the sixth signal output from the second Schmitt trigger inverter 634 according to an embodiment. As shown in FIG. 13, the sixth signal has a square waveform having the high value in the section of the first level of the first signal and the section of the second level of the first signal.

The sixth signal is input to the fourth transistor 636, and the fourth transistor 636 is electrically conducted in the section of the first level of the first signal and the section of the second level of the first signal, that is, in the section in which the sixth signal has the high value, and outputs a signal obtained by inverting the sixth signal. The fourth transistor 636 includes an NPN transistor. In the fourth transistor 636, a collector of the fourth transistor 636 is connected to the driving voltage Vcc, a base of the fourth transistor 636 is connected to the second Schmitt trigger inverter 634, and an emitter of the fourth transistor 636 is grounded. In the fourth transistor 636, when the sixth signal is in the high state, the collector and the emitter of the fourth transistor 636 conducts electrically and a voltage of the emitter which is grounded is output. In addition, when the sixth signal is in the low state, the driving voltage Vcc is output, and thus, a seventh signal which is obtained by inverting the sixth signal is output by the fourth transistor 636.

Figure 14:
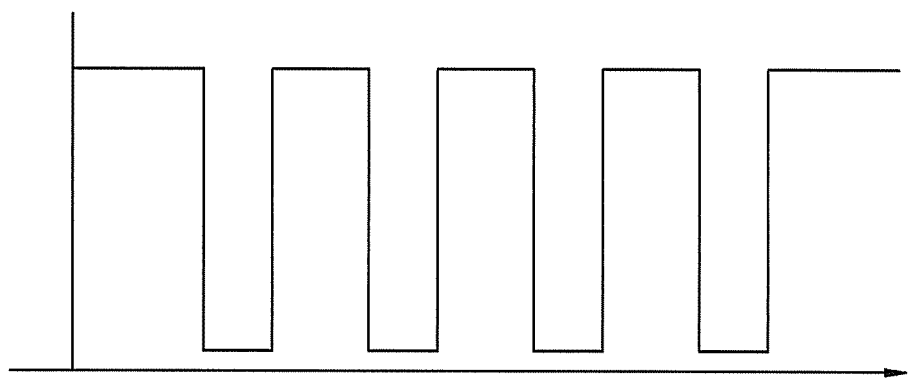
FIG. 14 is a waveform diagram of a seventh signal output from a fourth transistor in a device for detecting a horizontal synchronization signal in an image forming apparatus, according to an embodiment.

FIG. 14 is a waveform diagram of the seventh signal output from the fourth transistor 636 in a device for detecting a horizontal synchronization signal an the image forming apparatus, according to the embodiment. As shown in FIG. 14, the seventh signal has a waveform that is obtained by inverting the sixth signal.

The horizontal synchronization signal of the first beam is input to a regulator 638 from the second transistor 626, the seventh signal is input to the regulator 638 from the fourth transistor 636, and then, the regulator 638 performs an operation between the horizontal synchronization signal of the first beam and the seventh signal. In addition, the regulator 638 outputs the performed signal as the horizontal synchronization signal of the second beam. It is noted that the operation can be performed by an Exclusive NOR gate.

Figure 15:
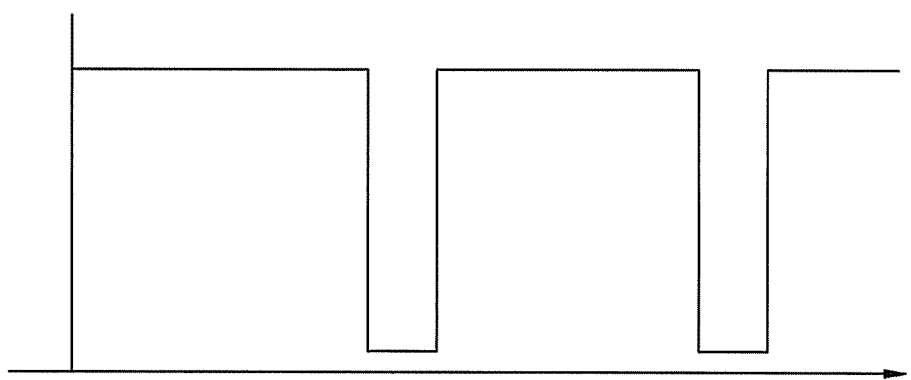
FIG. 15 is a waveform diagram of a horizontal synchronization signal of a second beam in the device for detecting the horizontal synchronization signal in the image forming apparatus according to an embodiment.

FIG. 15 is a waveform diagram of the horizontal synchronization signal of the second beam in a device for detecting a horizontal synchronization signal of an image forming apparatus, according to an embodiment. As shown in FIG. 15, the horizontal synchronization signal of the second beam has a waveform that is obtained by performing an operation between the horizontal synchronization signal of the first beam and the seventh signal.

As described above, according to the device for detecting the horizontal synchronization signal of the image forming apparatus of the embodiment, the light intensities of the first beam and the second beam emitted from two light sources are different from each other, and one photo detector receives the two beams having different light intensities. Therefore, the horizontal synchronization signals may be detected by two photo detectors in the color image forming apparatus including four light sources.

Figure 16:
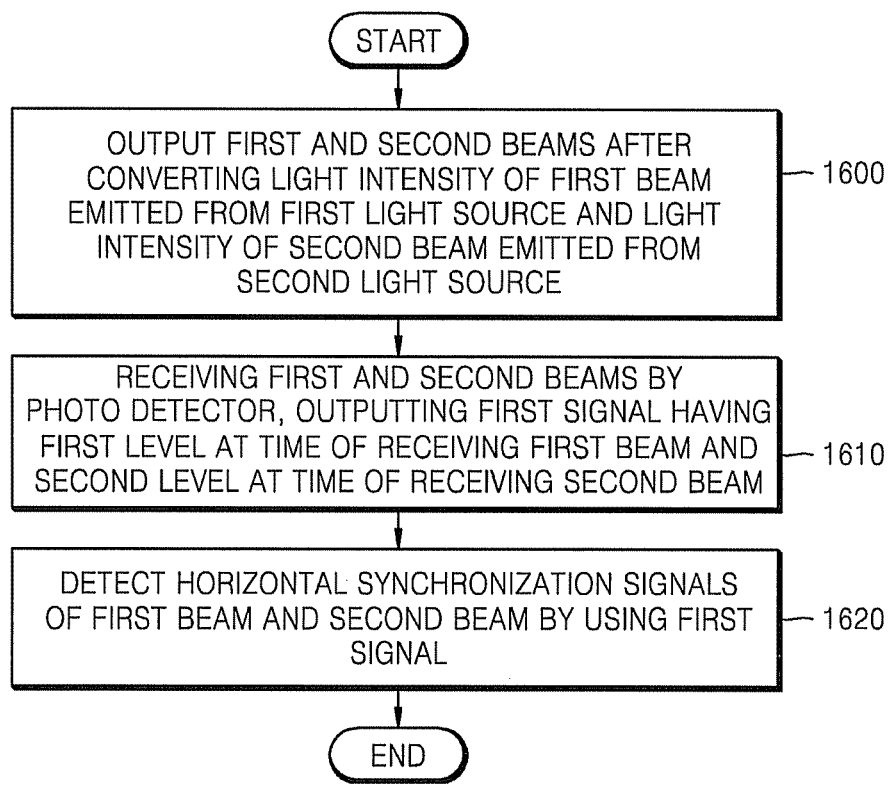
FIG. 16 is a flowchart illustrating a method of detecting a horizontal synchronization signal of an image forming apparatus, according to an embodiment.

FIG. 16 is a flowchart illustrating a method of detecting a horizontal synchronization signal of an image forming apparatus, according to an embodiment.

Hereinafter, the method of detecting a horizontal synchronization signal of an image forming apparatus according to the embodiment will be described as follows.

In operation 1600, the first beam emitted from the first light source 110a and the second beam emitted from the second light source 110b are converted to have different light intensities from each other. Here, the slit 216 shown in FIG. 3, the filter 218 shown in FIG. 4, or the beam detecting lenses having different transmittances from each other shown in FIG. 5 may be used to change the light intensities of the first and second beam to be different from each other.

In operation 1610, the horizontal synchronization signal detector 600 receives the first and second beams output from the photo detector 220, and outputs the first signal having the first level at the time of receiving the first beam and the second level at the time of receiving the second beam. The waveform of the first signal is shown in FIG. 8.

In operation 1620, the first horizontal synchronization signal of the first beam and the second horizontal synchronization signal of the second beam are detected by using the first signal. The first signal output from the photo detector 220 is input to the two transistors via the current mirror. At this time, the two transistors are conducted at different sections from each other by setting base voltages thereof to be different from each other. That is, one of the two transistors is set to be conducted in the sections of the first level and the second level in the first signal, and the other of the two transistors is set to be conducted in the section of the second level of the first signal. The processes of detecting the horizontal synchronization signals of the first and second beams are described above with reference to FIG. 7, and thus, the descriptions thereof are not provided here. In addition, the waveform of the horizontal synchronization signal of the first beam is shown in FIG. 11 and the waveform of the horizontal synchronization signal of the second beam is shown in FIG. 15.

In addition, other embodiments of the present invention can also be implemented through computer readable code/instructions in/on a medium, e.g., a computer readable medium, to control at least one processing element to implement any above described embodiment. The computer readable code can be recorded/transferred on a medium in a variety of ways, examples of the medium including recording media, such as magnetic storage media (e.g., ROM, floppy disks, hard disks, etc.) and optical recording media (e.g., CD-ROMs, or DVDs), and transmission media such as Internet transmission media.

While an embodiment or embodiments have been particularly shown and described with reference to exemplary embodiments thereof, it will be understood by those of ordinary skill in the art that various changes in form and details may be made therein without departing from the spirit and scope of the embodiments as defined by the following claims.

What is claimed is:

1. A device for detecting a horizontal synchronization signal of an image forming apparatus, the device comprising:
   a light intensity converter to convert light intensity of a first beam emitted from a first light source and light intensity of a second beam emitted from a second light source, and outputting the first and second beams;
   a photo detector to receive the first beam and the second beam output from the light intensity converter, and to output a first signal having a first level at a time of receiving the first beam and a second level at a time of receiving the second beam; and
   a horizontal synchronization signal detector to detect a horizontal synchronization signal of the first beam and a horizontal synchronization signal of the second beam by using the first signal,
   wherein the conversion of the light intensity of the first beam is different from the conversion of the light intensity of the second beam such that the first level and the second level are different from each other.

2. The device of claim 1, wherein the light intensity converter comprises:
   a first beam detecting lens, which is located on a proceeding path of the first beam, to convert the first beam to be suitable for the photodiode;
   a slit located on a proceeding path of the second beam for reducing the light intensity of the second beam; and
   a second beam detecting lens to convert the second beam transmitting through the slit to be suitable for the photodiode.

3. The device of claim 2, wherein the slit is a form of rib.

4. The device of claim 1, wherein the light intensity converter comprises:
   a first beam detecting lens, which is located on a proceeding path of the first beam, to convert the first beam to be suitable for the photodiode;
   a filter located on a proceeding path of the second beam for reducing the light intensity of the second beam; and
   a second beam detecting lens to convert the second beam transmitting through the slit to be suitable for the photodiode.

5. The device of claim 1, wherein the light intensity converter comprises:
   a first beam detecting lens, which is located on a proceeding path of the first beam, to convert the first beam to be suitable for the photodiode; and
   a second beam detecting lens, which is located on a proceeding path of the second beam, for converting the second beam to be suitable for the photodiode,
   wherein the first beam detecting lens and the second beam detecting lens have different transmittances from each other.

6. The device of claim 1, wherein the horizontal synchronization signal detector comprises:
   a first beam horizontal synchronization signal detector to detect a square wave signal which is obtained by inverting a second signal having the first level at the time of receiving the first beam as the horizontal synchronization signal of the first beam; and
   a second beam horizontal synchronization signal detector to detect a signal which is obtained by performing an operation between the horizontal synchronization signal of the first beam and a square wave signal which is obtained by inverting the first signal as the horizontal synchronization signal of the second beam.

7. The device of claim 6, wherein the horizontal synchronization signal detector further comprises a current mirror to output the first signal to the first beam horizontal synchronization signal detector and the second beam horizontal synchronization signal detector.

8. The device of claim 7, wherein the first beam horizontal synchronization signal detector comprises:
   a first transistor to receive the first signal, and electrically conducted in a section of the first level in the first signal to output a third signal which is obtained by inverting the second signal;
   a first Schmitt trigger inverter to receive the third signal, and outputting a square wave signal which is obtained by inverting the third signal as a fourth signal; and a second transistor to receive the fourth signal, and electrically conducted in a section of the fourth signal which corresponds to the section of the first level in the second signal to detect a signal which is obtained by inverting the fourth signal as the horizontal synchronization signal of the first beam.

9. The device of claim 7, wherein the second beam horizontal synchronization signal detector comprises:
a third transistor to receive the first signal, and electrically conducted in a section of the first level and a section of the second level in the first signal to output a fifth signal which is obtained by inverting the first signal;
a second Schmitt trigger inverter to receive the fifth signal and outputting a square wave signal which is obtained by inverting the fifth signal as a sixth signal;
a fourth transistor to receive the sixth signal, and electrically conducted in sections of the sixth signal which correspond to the sections of the first level and the second level in the first signal to output a signal which is obtained by inverting the sixth signal as a seventh signal; and
a regulator to output a signal which is obtained by performing an operation between the horizontal synchronization signal of the first beam and the seventh signal as a horizontal synchronization signal of the second beam.

10. The device of claim 9, wherein the regulator is an Exclusive NOR gate.

11. The device of claim 1, wherein the photo detector is a photodiode.

12. A method of detecting a horizontal synchronization signal of an image forming apparatus, the method comprising:
converting light intensity of a first beam emitted from a first light source and light intensity of a second beam emitted from a second light source and outputting the first and second beams;
receiving the outputted first beam and the outputted second beam by a photo detector, and outputting a first signal having a first level at a time of receiving the first beam and a second level at a time of receiving the second beam; and
detecting a horizontal synchronization signal of the first beam and a horizontal synchronization signal of the second beam by using the first signal,
wherein the converting of the light intensity of the first beam is different from the converting of the light intensity of the second beam such that the first level and the second level are different from each other.

13. The method of claim 12, wherein the outputting of the first beam and the second beam comprises converting the light intensities of the first beam and the second beam to be different from each other by using a slit.

14. The method of claim 12, wherein the outputting of the first beam and the second beam comprises converting the light intensities of the first beam and the second beam to be different from each other by using a filter.

15. The method of claim 12, wherein the outputting of the first beam and the second beam comprises converting the light intensities of the first beam and the second beam to be different from each other by using beam detecting lenses having different transmittances.

16. The method of claim 12, wherein the detecting of the horizontal synchronization signals comprises:
detecting a square wave signal which is obtained by inverting a second signal having a first level at a time of receiving the first beam by the photo detector as a horizontal synchronization signal of the first beam; and
detecting a signal obtained by operating between the horizontal synchronization signal of the first beam and the square wave signal which is obtained by inverting the first signal as a horizontal synchronization signal of the second beam.

17. The method of claim 12, wherein the detecting of the horizontal synchronization signal of the first beam comprises:
receiving the first signal, and electrically conducted in a section of the first level in the first signal to output a third signal which is obtained by inverting a second signal by a first transistor;
receiving the third signal, and outputting a square wave signal which is obtained by inverting the third signal as a fourth signal by a first Schmitt trigger inverter; and
receiving the fourth signal, and electrically conducted in a section of the fourth signal which corresponds to the section of the first level in the second signal to detect a signal which is obtained by inverting the fourth signal as the horizontal synchronization signal of the first beam by a second transistor.

18. The method of claim 12, wherein the detecting of the horizontal synchronization signal of the second beam comprises:
receiving the first signal, and electrically conducted in a section of the first level and a section of the second level in the first signal to output a fifth signal which is obtained by inverting the first signal by a third transistor;
receiving the fifth signal and outputting a square wave signal which is obtained by inverting the fifth signal as a sixth signal by a second Schmitt trigger inverter;
receiving the sixth signal, and electrically conducted in sections of the sixth signal which correspond to the sections of the first level and the second level in the first signal to output a signal which is obtained by inverting the sixth signal as a seventh signal by a fourth transistor; and
outputting a signal which is obtained by operating an operation between the horizontal synchronization signal of the first beam and the seventh signal as a horizontal synchronization signal of the second beam by a regulator.

19. The method of claim 18, wherein the regulator is an Exclusive NOR gate.

20. The method of claim 12, wherein the photo detector is a photodiode.

21. A computer readable recording medium having embodied thereon a computer program for executing the method of claim 12.

* * * * *